(12) United States Patent
Botsko et al.

(10) Patent No.: US 10,569,150 B1
(45) Date of Patent: Feb. 25, 2020

(54) GAME CALL ANALYZER AND SIMULATOR SOFTWARE SYSTEMS

(71) Applicants: Phillip Botsko, Chester, NJ (US); Eleanor Botsko, Chester, NJ (US); Julia Lynn Botsko Medford, Kennesaw, GA (US); Shannon Botsko Hellwig, Long Valley, NJ (US); Cynthia Botsko, Cassadaga, FL (US)

(72) Inventors: Phillip Botsko, Chester, NJ (US); Eleanor Botsko, Chester, NJ (US); Julia Lynn Botsko Medford, Kennesaw, GA (US); Shannon Botsko Hellwig, Long Valley, NJ (US); Cynthia Botsko, Cassadaga, FL (US)

( * ) Notice: Subject to any disclaimer, the term of this patent is extended or adjusted under 35 U.S.C. 154(b) by 594 days.

(21) Appl. No.: 13/937,758

(22) Filed: Jul. 9, 2013

Related U.S. Application Data (60) Provisional application No. 61/669,238, filed on Jul. 9, 2012.

(51) Int. Cl.
*A63B 69/00* (2006.01)

(52) U.S. Cl.
CPC .................................. *A63B 69/00* (2013.01)

(58) Field of Classification Search
CPC .......... G09B 23/00; G09B 23/26; A63B 69/00
See application file for complete search history.

(56) References Cited

U.S. PATENT DOCUMENTS

| | | | |
|---|---|---|---|
| 5,956,463 A | 9/1999 | Hanson | |
| 7,373,110 B1 | 5/2008 | McClain | |
| 2004/0107104 A1 | 6/2004 | Schaphorst | |
| 2007/0033010 A1 | 2/2007 | Jones | |
| 2011/0082574 A1 | 4/2011 | Pachet | |

*Primary Examiner* — Timothy A Musselman
(74) *Attorney, Agent, or Firm* — Bruce A. Lev (57) ABSTRACT

A game call analyzer and simulate software system may include a software program that may be user-installable onto a plurality of mobile and non-mobile computing devices (computers, smartphones, tablets, etc.) that may be assist wildlife hunters to better attract a targeted game-animal by trying hunters to mimic various game calls. The game call software program may comprise a plurality of user-executable functions for recording, analyzing, and displaying information relevant to simulating a game call of a game-animal.

17 Claims, 6 Drawing Sheets

GAME CALL ANALYZER AND SIMULATOR SOFTWARE SYSTEMS

CROSS-REFERENCE TO RELATED APPLICATION

The present application is related to and claims priority from prior provisional application Ser. No. 61/669,238, filed Jul. 9, 2012 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of software program usage with wildlife and more specifically relates to a game call analyzer including a computer software program, specially designed for hunters of animals that may be interacted with by emitting distinctive calls from an electronic device.

2. Description of the Related Art

Hunting may be instinctual. For many thousands of years before the agricultural revolution, mankind's only source of food resulted from hunting and gathering. Before gunpowder and steel traps, bows and arrows, as well as snares and spears, prevailed as weapons of choice. Hunters were looked up to as warriors, the main bread-winners of civilized life. At one point in time, furs were a source of money, and trade revolved around the trapping of fur-bearing animals. As time has progressed, the usefulness of the hunter has steadily decreased in the eyes of society. However, hunting is a stabilizing virtue in nature that keeps things in check, and the popularity of hunting for sport is strong.

Waterfowl hunting is popular. This game primarily consisting of geese and ducks; wildfowl hunting season is generally in the fall and winter months, when the birds have finished raising their young and are migrating to warmer areas, and thus make easier targets. However, successfully hunting wildfowl requires certain skills that are not always inherent even in the most experienced sportsman. Fast moving flying animals, wildfowl need to be attracted, and then lulled into feeling a measure of safety, in order for a hunter to score an accurate shot. Perhaps the go-to method for achieving this is the bird call. Simulated duck or goose sounds are often used to attract birds; sometimes, calls of other birds will also be used to convince the birds that there is no danger. Yet, if the calls are incorrectly executed, wildfowl are smart enough to realize a deadly trap is trying to be laid for them, and will quickly avoid the direction from which the false sound is coming. While a hunter may think he is appropriately mimicking a mallard, the duck is able to discern any inaccuracies and can swiftly escape the line of fire.

Various attempts have been made to solve problems found in computer interfaces that may compare and analyze animal call sounds art. Among these are found in: U.S. Pat. No. 6,757,574 to William James Gardner, U.S. Pub. No. 2007/0033010 to Lawrence P. Jones; U.S. Pub. No. 2011/0082574 to Francois Pachet et al; U.S. Pat. No. 5,956,463 to William G. Hanson; and U.S. Pub. No. 2004/0107104 to Richard A. Schaphorst. This prior art is representative of animal call means.

Ideally, a game call analyzer and simulator software systems should provide a convenient and easy-to-use means for recording a game call, analyzing and identifying the game call, and for simulating a game call sound for modifying the behavior of a targeted animal, and, yet would operate reliably and be manufactured at a modest expense. Thus, a need exists for a reliable game call analyzer and simulator software systems to be mobile and easily accessible for improving a user's ability to hunt game and to solve the above-mentioned problems.

BRIEF SUMMARY OF THE INVENTION

In view of the foregoing disadvantages inherent in the known animal game call reproducing software program art, the present invention provides a novel game call analyzer and simulator software system. The general purpose of the present invention, which will be described subsequently in greater detail, is to provide an executable computer software program, specially designed for hunters of all animals, such as wildfowl (geese and ducks), elk, moose, water fowl, fur-bearing animals, feathered game, and virtually any animal that has a distinct game call, which may assist them in properly executing these distinctive calls for better attracting their marks. The tangible result is use of an electronic device to emit audible sounds to interact as desired with an animal.

A game call analyzer and simulator software systems for modifying a behavior of at least one game animal is disclosed herein, in a preferred embodiment, and may generally comprise a game call software program, at least one software program executable medium, and at least one end-user's device. The game call software program of the present invention may comprise at least one database, a sound recorder function, an analyzer function, the analyzer function comprising a sound wave synthesizer, an image display function, and a game call simulator function. The sound recorder function may be in communication with an existing microphone on the end user's device. The image display function may be in communication with a display screen of the end user's device. The game call simulator function may be in communication with at least one speaker of the end user's device. The at least one database, the sound recorder function, the analyzer function, the game call simulator function, and the image display function comprises in combination the game call software program. The game call software program may be installable by a user to the end-user's device via the at least one software program executable medium.

With reference now to the game call software program, one of the databases may comprises a game call library database. The game call library database comprises at least one processed game call sound, along with a plurality of pre-recorded and pre-programmed processed game call sounds. The game call library database comprises at least one category for organizing the game-animal(s), and each category may comprise at least one sub-category for further organizing the game-animal(s). Sub-categories may also be programmed to have sub-categories thereby permitting the user to organize the game animal(s) even further. Another database may comprise an unprocessed game call database. The sound recorder function may be user-executable to record an unprocessed game call sound of the game animal. The unprocessed game call sound may then be stored in the unprocessed game call database.

With particular reference to the analysis part of the game call software program, the processed game call sound may comprise a first-sound wave frequency, and the unprocessed game call sound may comprise a second-sound wave frequency. The analyzer function may analyze the unprocessed game call sound by comparing the first-sound wave frequency with the second-sound wave frequency using the sound wave synthesizer. Further, the analyzer function may further compare the first-sound wave frequency with the second-sound wave frequency and determine an accuracy-percentage number which may be displayed to the user on the end-user's device via the image display function. The image display function may display the first-sound wave frequency and the second-sound wave frequency via at least one sound wave graph on the end-user's device.

With reference now to the simulator function of the game call software program, the game call simulator function is user-executable to reproduce the processed game call sound via the existing sound systems of the end-user's device. The simulator function may be useful for attracting the game-animal toward the user by reproducing the processed game call sound known to attract the game-animal. The simulator function may further being useful for frightening the game-animal away from the user by simulating the processed game call sound known to frighten the game-animal. It will be appreciated that game call analyzer and simulator software systems is selectively usable on the end-user's device for identifying the unprocessed game call sound produced by a game-animal via the analyzer function and for reproducing the processed game call sound of the game-animal via the game call simulator function to alter the behavior of the game-animal as preferred by the user.

The game call analyzer and simulator software systems for use a computer may comprise a first kit which may include at least one CD rom having the game call software program, and a set of user instructions.

In another embodiment, the game call analyzer and simulator software systems for use with a smartphone may comprise a second kit which may include a downloadable mobile application comprising the game call software program, and a set of user instructions.

A method of using the game call analyzer and simulator software systems may comprise the steps of installing the game call software program onto the end-user's device via the software program executable medium, recording and analyzing the unprocessed game call via the analyzer function, identifying and displaying the accuracy-percentage, and an optional step of simulating the processed game call for attracting or frightening the game animal targeted by the user.

The present invention holds significant improvements and serves as a game call analyzer and simulator software system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, game call analyzer and simulator software systems, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a game call analyzer and a software program device and more particularly to game call analyzer and simulator software systems specially designed for hunters of all animals, such as wildfowl (geese and ducks), elk, moose, and many others, which may assist in properly executing these distinctive calls for better attracting their marks.

Generally speaking, game call analyzer and simulator software systems may comprise a designed computer software program, customized to game for hunters of wild life, particularly wildfowl such as geese and ducks, that may allow a user to compare their own calls to the actual sounds created by a variety of wildfowl species to determine accuracy success. In this manner, game call analyzer and simulator software systems offers hunters a helpful tool in improving their calling sounds. Game call analyzer and simulator software systems may be available as a CD-ROM unit configured for easy installation on virtually any computer platform, whether PC or Mac. Additionally, game call analyzer and simulator software systems may be made available as a digital download or as an application for a smart phone or iPod.

The game call software program may allow a user to record his or her version of a wildlife call. When a bird call, for example, is entered into a device, the program may perform an electronic comparison of the recorded voice to the actual bird sound, preprogrammed into the software. This analysis may determine an accuracy-percentage between the sounds, and convey this information to the user. With a series of graphics accompanying the sounds of various wildlife, game call analyzer and simulator software systems may provide a comprehensive library of correct calls from which to choose. In one example, this library may start with a category such as Fowl Ducks and may include the various calls from ducks such as pintails, teal, wood ducks, diving ducks and other ducks including the calls of both the male (drake) and the female (hen). In the same manner, the distinct cadences of geese, elk, moose, deer, bears and the like, may also be included and categorized. An object of the present invention is to offer wildlife hunters with a convenient, effective means of increasing their chances of attracting their chosen game through proper calling sounds.

A specially configured computer program may compare the accuracy of recorded sounds with the proper calls, and game call analyzer and simulator software systems may also allow hunters to fine-tune their sounds to better match the calls that will attract these animals. Thus by mimicking sounds according to those found in a specific natural environment, game call analyzer and simulator software systems may facilitate an effective means of drawing in an animal, leading to a more productive hunting experience. Programmed with a vast array of wildlife sounds, this product is sure to appeal to duck hunters, geese hunters, turkey hunters, deer hunters, and elk hunters, to name some examples.

Figure 1:
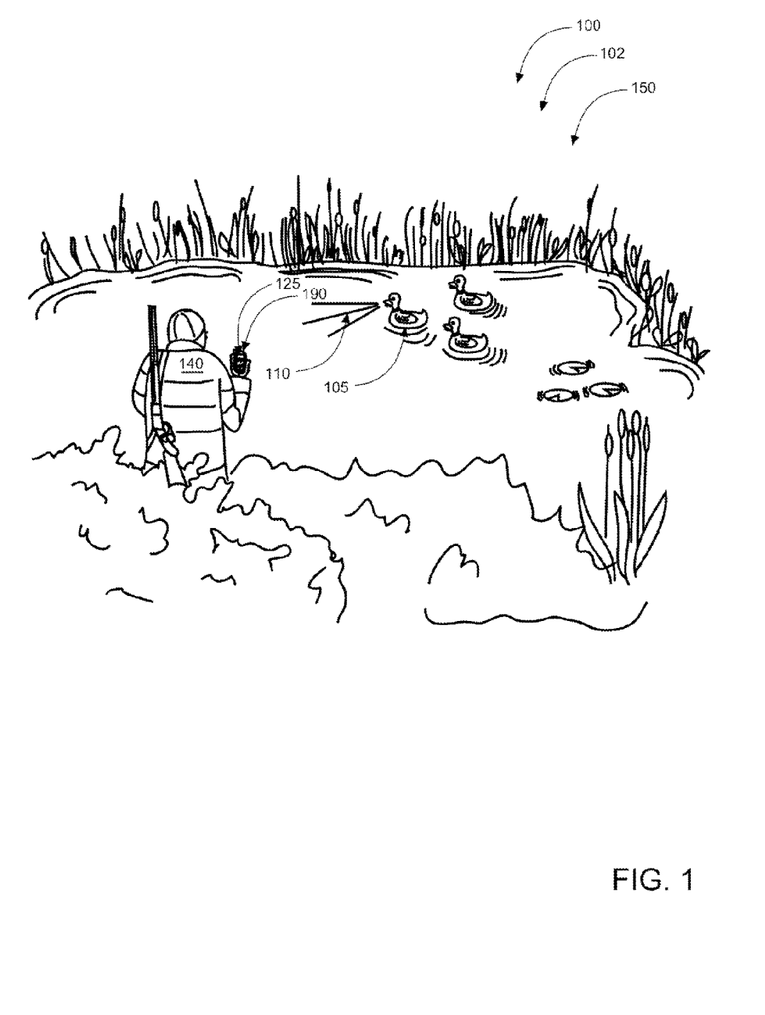
FIG. 1 shows a perspective view illustrating a game call analyzer and simulator software systems during 'in-use' condition showing a user recording a game call of a game animal comprising a duck according to an embodiment of the present invention.

Referring now to the drawings by numerals of reference there is shown in FIG. 1 a perspective view illustrating game call analyzer and simulator software systems 100 during 'in-use' condition 150.

Game call analyzer device and simulator software systems 100 may comprise game call software program 102, software program executable medium 305, and end-user's device 125. As shown, a function of game call analyzer device and simulator software systems 100 may allow user 140 to record game call 110 of game animal 105. By way of example, game animal 105 may be a duck, as shown in FIG. 1. Game call analyzer device and simulator software systems 100 may comprise game call software program 102 which may be accessed and used by user 140 via end-user's device 125. End-user's device 125 may comprise mobile device 190, as shown. Mobile device 190 may be a smartphone, PDA, tablet, mini-tablet, iPod, or the like, as shown in FIGS. 2B and 2C. Alternatively, end-user's device 125 may comprise computer 290, as shown in FIG. 2A.

In continuing to refer to FIG. 1, user 140 may access game call software program 102 of game call analyzer and simulator software systems 100 for recording game call 110 of game animal 105 via mobile device 190. In an embodiment of the present invention, game call software program may comprise database 310, sound recorder function 315, analyzer function 320, image display function 325, and game call simulator function 330. These functions are shown and discussed in greater detail in FIG. 3. It should be noted however that user 140 may use sound recorder function 315 to capture game call 110 made by game animal 105 comprising a duck, and user 140 may further learn and simulate game call 110 of another animal known to attract game animal 105 of interest to user 140.

Figures 2A, 2B, 2C:
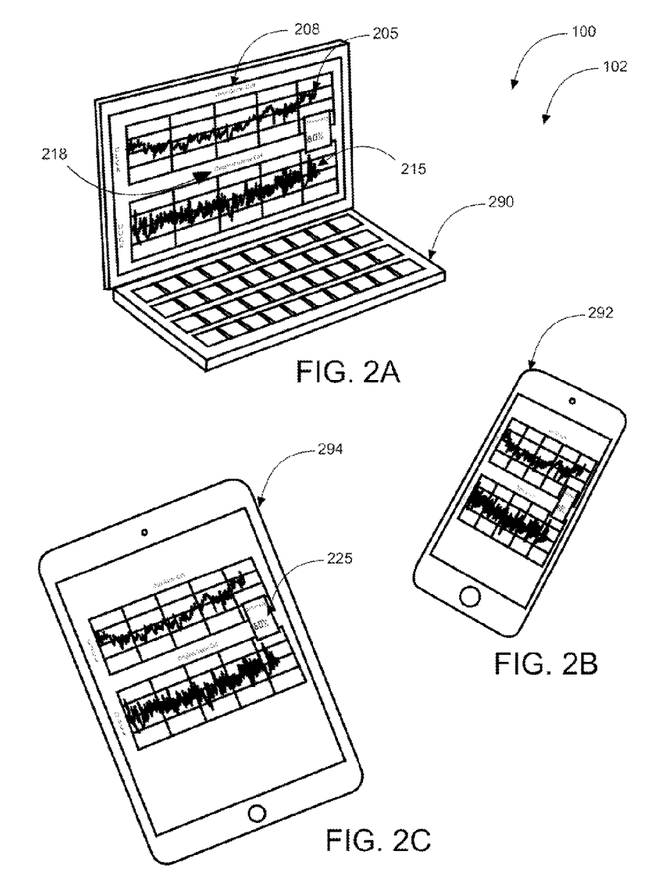
FIG. 2A shows a perspective view illustrating an end-user device (laptop computer) which may be used to operate a game call software program according to an embodiment of the present invention of FIG. 1.
FIG. 2B shows a perspective view illustrating another end-user device (smart phone) which may be used to operate a game call software program according to an embodiment of the present invention of FIG. 1.
FIG. 2C shows a perspective view illustrating yet another end-user device (tablet) which may be used to operate a game call software program according to an embodiment of the present invention of FIG. 1.

Referring generally now to FIGS. 2A-2C showing end-user device(s) 125 which may be used to operate game call software program 102 of game call analyzer and simulator software systems 100 according to an embodiment of the present invention of FIG. 1. As shown in FIG. 2A, end-user's device 125 may comprise computer 290. Computer 290 may comprise a laptop or desktop computer. As shown in FIG. 2B, end-user's device 125 may comprise smartphone 292. Smartphone 292 may comprise an iPhone, Android, Samsung, or the like. As shown in FIG. 2C, end-user's device 125 may comprise tablet 294. Tablet 294 may comprise an iPad, Kindle, Playbook, Lenovo, or the like. These embodiments are illustrated by way of example, and it may be appreciated that end-user's device 125 generally comprises a mobile computing and communications device which may include a display screen, a sound systems with at least one speaker, and a microphone. These features of end-user's device 125 may be in communication with sound recorder function 315, analyzer function 320, image display function 325, and game call simulator function 330 of game call software program 102.

In continuing to refer to FIGS. 2A-2C, it may be seen that the display screen of end-user's device 125 shows first-sound wave frequency 205 and second-sound wave frequency 215. In one embodiment of the present invention, first-sound wave frequency 205 may comprise a sound wave frequency representing unprocessed game call 208. Unprocessed game call 208 may comprise a new sound recording of game call 110 of game animal 105. Further, second-sound wave frequency 215 may comprise processed game call 218. Processed game call 218 may comprise at least one game call 110 that may has been previously analyzed and pre-programmed into database 310 of game call software program 102. In use, analyzer function 320 of game call software program 102 may compare unprocessed game call 208 with at least one processed game call 218 by analyzing first-sound wave frequency 205 with second-sound wave frequency 215 and determining accuracy-percentage 225. It should be appreciated that accuracy-percentage 225 may be displayed to user 140 on end-user's device 125 via image display function 325. In one embodiment, first-sound wave frequency 205 and second-sound wave frequency 215 may be displayed via a sound wave graph, as shown in FIGS. 2A-2C.

Figure 3:
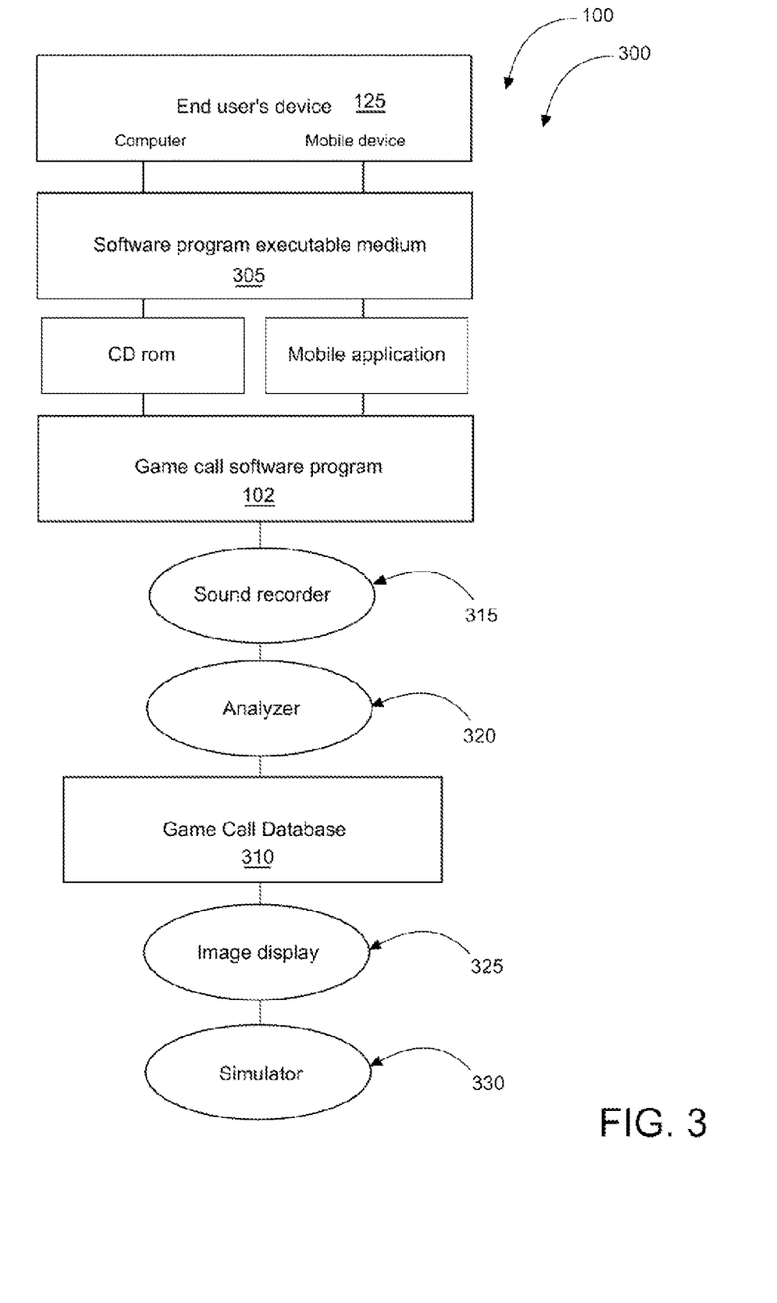
FIG. 3 is a usage flowchart for the game call analyzer and simulator software systems according to an embodiment of the present invention.

Referring now to FIG. 3, illustrating usage flowchart 300 of game call analyzer and simulator software systems 100 according to an embodiment of the present invention of FIGS. 1-2.

User 140 may first select a preferred end-user's device 125 with which to operate game call analyzer and simulator software systems 100. Next, user 140 may use software program executable medium 305 to install game call software program 102 onto end-user's device 125. In one version of the present invention, user 140 may opt to install game call software program 102 onto end-user's device 125 comprising computer 290 via CD rom 505. It should be appreciated that game call software program 102 may be installable onto computer 290 that is either a PC or a Mac. In another version, user 140 may opt to install game call software program 102 onto end-user's device 125 comprising mobile device 190 via mobile application 515 which may be downloadable by user 140 onto mobile device 190. Mobile device 190 may comprise smartphone 292, tablet 294, or any other mobile electronic computing device. Mobile application 515 may comprise an "app" that may be downloadable from a mobile application marketplace, or may be downloadable directly via a website.

In continuing to refer to FIG. 3, game call software program 102 may be accessed by user 140 via end-user's device 125 and may then gain access to a variety of functions as provided by game call analyzer and simulator software systems 100, as shown. Game call software program 102 may comprise, in combination, at least one database 310, sound recorder function 315, analyzer function 320, image display function 325, and game call simulator function 330.

With particular reference now to database 310 of game call software program 102, it should be noted that at least one database 310 comprises a game call library database. The game call library database may comprise at least one processed game call 218. Further, at least one database 310 may comprise an unprocessed game call database. The unprocessed game call database may temporarily or permanently store unprocessed game call(s) 208.

In continuing to refer to FIG. 3, user 140 may record game call 110 of game animal 105 via sound recorder function 315. Sound recorder function 315 of game call software program 102 may record game call 110 by generating a sound wave file. The sound wave file may be stored in database 310. As briefly discussed above, game call 110 recorded by user 140 that is new may be classified as unprocessed game call 208 and may be temporarily or permanently stored in database 310 comprising an unprocessed game call database. Game call 110 that has been pre-programmed into game call analyzer and simulator software systems 100 may be stored in database 310 comprising a game call library database. Alternatively, user 140 may record a mimic of game call 110 of game animal 105. In such a manner, user 140 may train his or her own voice to mimic game call 110 for attracting game animal 105 as desired by user 140.

In continuing to refer to FIG. 3, sound recorder function 315 may pass the sound wave file to analyzer function 320 of game call software program 102 for analysis. In one embodiment of the present invention, analyzer function 320 may comprise a sound wave synthesizer. The sound wave synthesizer may synthesize unprocessed game call 208 into first-sound wave frequency 205. Analyzer function 320 may further be in communication with database 310 comprising the game call library database. In such a manner, analyzer function 320 may recall processed game call 218 which may be synthesized by the sound wave synthesizer into second-sound wave frequency 215. In such a manner, first-sound wave frequency 205 may be compared to second-sound wave frequency 215 and determine accuracy-percentage 225.

In still referring to FIG. 3, unprocessed game call 208 comprising first-sound wave frequency 205 may be displayed to user 140 on an existing display screen of end-user's device 125. Processed game call 218 comprising second-sound wave frequency 215 may be displayed to user 140 on an existing display screen of end-user's device 125. In addition, accuracy-percentage 225 may be displayed to user 140 on an existing display screen of end-user's device 125.

It should be appreciated that accuracy-percentage 225 may be useful for identifying game animal 105 that may be unknown to user 140. This may be particularly useful for identifying an unknown animal and may be useful for determining relative size as well. Further, accuracy-percentage 225 may be useful for training user 140 on how to better mimic game call 110 of game animal 105 that user 140 wishes to emulate. This may be handy for user 140 comprising a game hunter to pretend to be game animal 105 by practicing game call 110 known and understood to attract another game animal 105 being hunted by user 140. Alternatively, user 140 may wish to frighten game animal 105 that may be dangerous for safety and emergency reasons.

Game call software program 102 may comprise game call simulator function 330 which may be user-executable for simulating either unprocessed game call 208 or processed game call 218. In such a manner, game call simulator function 330 may be in communication with a speaker assembly of end-user's device 125 for emitting a recording of either unprocessed game call 208 or processed game call 218, as selected by user 140.

It should be appreciated that processed game call(s) 218 may be stored on database 310 comprising the game call library database. In one embodiment of the present invention, database 310 may comprise at least one category. Further, each distinct category may comprise at least one sub-category. In such a manner, processed game call(s) 218 may be organized and sub-organized by genus, species, and sub-species as preferred by user 140. This may be particularly useful for convenient and easy recall by user 140 when using game call simulator function 330. It should be understood that game call simulator function 330 would most often be used with end-user's device 125 comprising mobile device 190.

Within continued reference to game call software program 102, game call simulator function 330 may be user-executable to simulate processed game call 218 of game animal 105 that is healthy. Alternatively, game call simulator function 330 may be user-executable to simulate processed game call 218 of game animal 105 that is wounded. This may be useful for further attracting or frightening game animal 105 as preferred by user 140.

Figure 4:
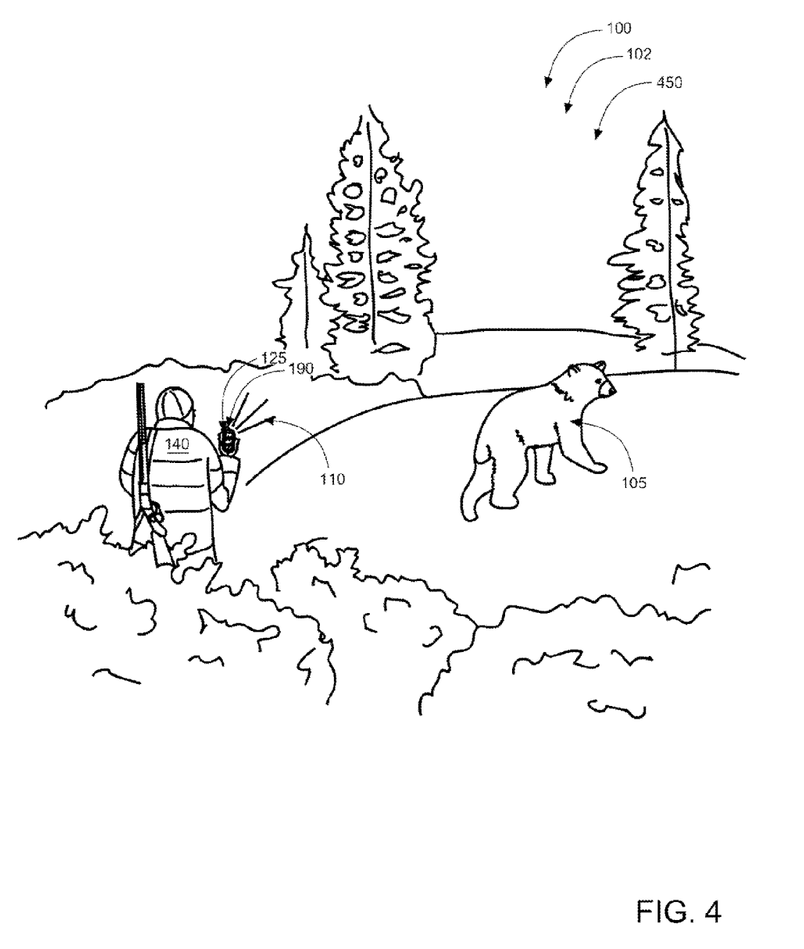
FIG. 4 is a perspective view illustrating the game call analyzer and simulator software systems during an alternative 'in-use' condition being used to frighten away a dangerous game animal, such as a bear, according to an embodiment.

Referring now to FIG. 4 showing a perspective view illustrating game call analyzer and simulator software systems 100 during alternative 'in-use' condition 450 as used to frighten game animal 105 that may be dangerous. As shown, user 140 may execute game call simulator function 330 of game call software program 102 using end-user's device 125 comprising mobile device 190 for emitting game call 110. In such a manner, game call simulator function 330 may assist user 140, such as the game hunter, to simulate game animal 105 known and identified to frighten game animal 105 that may be dangerous, such as a bear, as shown by way of example.

Figure 5A:
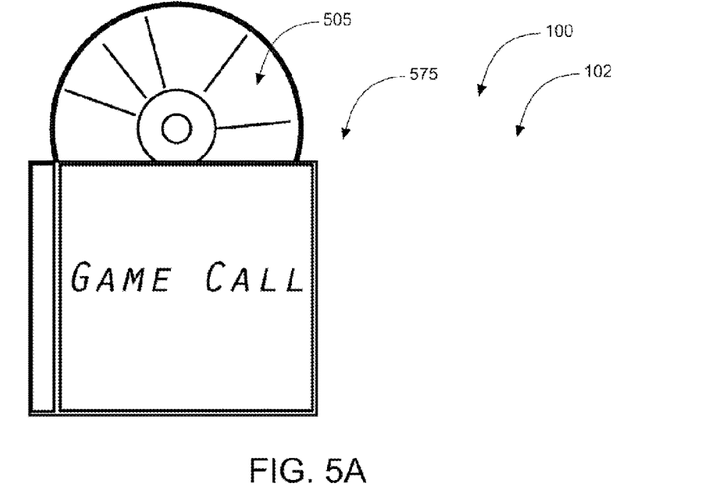
FIG. 5A is a perspective view illustrating a software program executable medium which may be used to install the game call software program according to an embodiment of the present invention.

Referring now to FIG. 5A showing a perspective view illustrating game call analyzer and simulator software systems 100 comprising first kit 575. As shown, first kit 575 may comprise game call software program 102 installable via software program executable medium 305 comprising CD rom 505. CD rom 505 may comprise a protective cover bearing a logo or indicia for game call analyzer and simulator software systems 100. First kit 575 may further comprise a set of user instructions. The set of user instructions may be in the form of a document file stored on CD rom 505 along with game call software program 102. It should be noted and understand that first kit 575 is most useful with end-user's device 125 comprising computer 290.

Figure 5B:
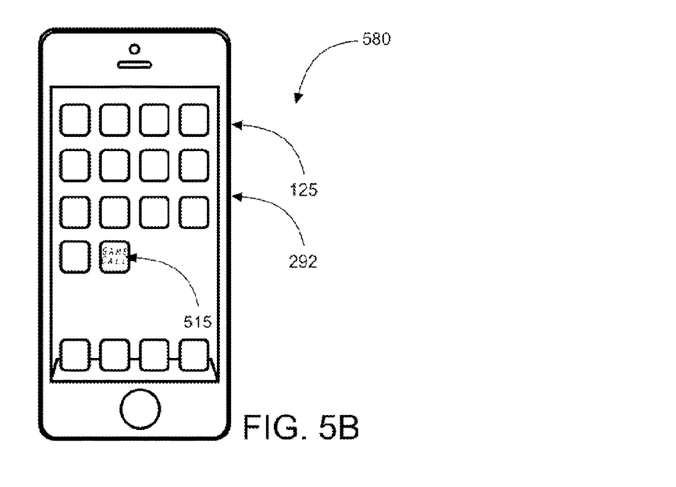
FIG. 5B is a perspective view illustrating another software program executable medium which may be used to install the game call software program according to an embodiment of the present invention.

Referring now to FIG. 5B showing a perspective view illustrating game call analyzer and simulator software systems 100 comprising second kit 580 according to an alternative embodiment of the present invention. As shown, second kit 580 may comprise game call software program 102 installable via software program executable medium 305 comprising mobile application 515. Mobile application 515 may comprise a downloadable application from an internet-based mobile application marketplace (ie. iTunes). The set of user instructions may be in a document file accessible within mobile application 515. Alternatively, mobile application 515 may be accessible via a website.

Game call analyzer and simulator software systems 100 may be manufactured and provided for sale in a wide variety of mediums for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different sound emitting combinations, parts may be sold separately, etc., may be sufficient.

As discussed herein, game call analyzer and simulator software systems 100 for modifying a behavior of game animal 105 may comprise game call software program 102 software program executable medium 305, and end-user's device 125. Game call software program 102 of the present invention may comprise database 310, sound recorder function 315, analyzer function 320 comprising a sound wave synthesizer, image display function 325, and game call simulator function 330. Sound recorder function 315 may be in communication with an existing microphone of end-user's device 125. Image display function 325 may be in communication with a display screen of end-user's device 125. Game call simulator function 330 may be in communication with at least one speaker of end-user's device 125. Further, database 310, sound recorder function 315, analyzer function 320, image display function 325, and game call simulator function 330 comprises in combination game call software program 102. Game call software program 102 may be installable by user 140 to end-user's device 125 via software program executable medium 305.

Figure 6:
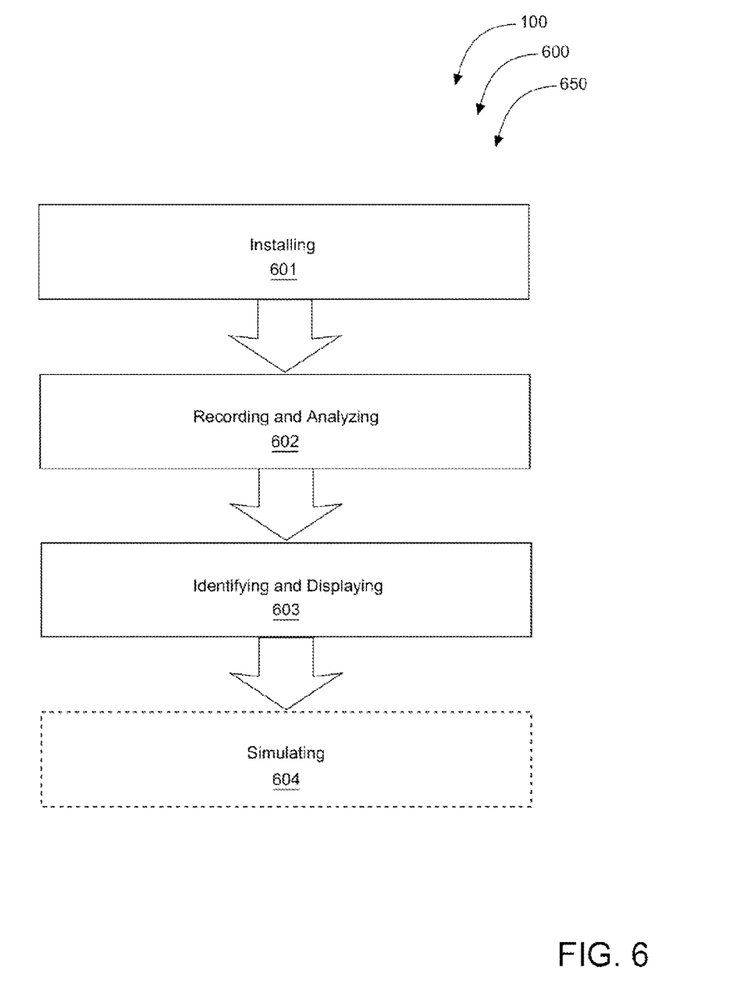
FIG. 6 is a flowchart illustrating a method of use for the game call analyzer and simulator software systems according to an embodiment of the present invention of FIGS. 1-5B.

Referring now to FIG. 6 showing flowchart 650 illustrating method of use 600 for game call analyzer and simulator software systems 100 according to an embodiment of the present invention of FIGS. 1-5B.

As shown, method of use 600 may comprise the steps of step one 601, installing game call software program 102 onto end-user's device 125 via software program executable medium 305, step two 602, recording and analyzing unprocessed game call 208 via analyzer function 320, step three 603, identifying and displaying accuracy-percentage 225, and step four 604 simulating processed game call 218 for attracting or frightening game animal 105 targeted by user 140. It should be noted that step four 604 is an optional step and may not be implemented by user 140 in every instance. Optional steps of method of use 600 are designated using dashed lines, as shown in FIG. 6.

It should also be noted that the steps described in the method of use can be carried out in many different orders according to user preference. The use of "step of" should not be interpreted as "step for", in the claims herein and is not intended to invoke the provisions of 35 U.S.C. § 112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A game call analyzer device comprising:
  a housing comprising;
    an outer shell defining an interior volume; and
    an end user's device within said outer shell and inside said interior volume and accessible to a user via a surface of said housing;
  a computer located inside said interior volume of said housing, said computer being in electronic communication with said end user device, said computer including;
    a game call software program comprising;
      at least one database;
      at least one sound recorder function;
      at least one analyzer function;
      at least one image display function; and
      at least one game call simulator function;
    at least one software program executable medium;
  wherein said at least one database, said at least one sound recorder function, said at least one analyzer function, said at least one image display function, and said at least one game call simulator function comprises in combination said game call software program;
  wherein said game call software program is installable by a user to said at least one end-user's device via said at least one software program executable medium;
  wherein said at least one database comprises a game call library database;
  wherein said game call library database comprises at least one processed game call sound;
  wherein said at least one database comprises an unprocessed game call database;
  wherein said at least one sound recorder function is user-executable to record an unprocessed game call sound;
  wherein said unprocessed game call sound is stored in said unprocessed game call database;

wherein said processed game call sound comprises a first-sound wave frequency;

wherein said unprocessed game call sound comprises a second-sound wave frequency;

wherein said at least one analyzer function analyzes said unprocessed game call sound by comparing said first-sound wave frequency with said second-sound wave frequency;

wherein said at least one image display function displays said first-sound wave frequency and said second-sound wave frequency via at least one sound wave graph on said at least one end-user's device;

wherein said at least one game call simulator function is user-executable to reproduce said processed game call sound via an existing sound systems on said at least one end-user's device; and wherein said game call software program is selectively usable on said at least one end-user's device for identifying said unprocessed game call sound of at least one game-animal via said analyzer function and for reproducing said processed game call sound of said at least one game-animal via said game call simulator function to alter a behavior of said at least one game-animal as preferred by said user.

2. The game call analyzer device of claim 1 wherein said simulator function is useful for attracting said at least one game-animal to said user by reproducing said processed game call sound known to attract said game-animal.

3. The game call analyzer and device of claim 2 wherein said game call library database comprises a plurality of preprogrammed said processed game call sounds.

4. The game call analyzer and device of claim 3 wherein said game call library database comprises at least one category for organizing said game-animal(s).

5. The game call analyzer and device of claim 4 wherein said at least one category comprises at least one sub-category for further organizing said game-animal(s).

6. The game call analyzer and device of claim 5 wherein said analyzer function comprises a sound wave synthesizer.

7. The game call analyzer and device of claim 6 wherein said sound wave synthesizer compares said first-sound wave frequency with said second-sound wave frequency and determines an accuracy-percentage displayed to said user on said end-user's device via said image display function.

8. The game call analyzer and device of claim 7 wherein said game call simulator function simulates said processed game call sound of said game-animal that is healthy.

9. The game call analyzer and device of claim 7 wherein said game call simulator function simulates said processed game call sound of said game-animal that is wounded.

10. The game call analyzer and device of claim 7 wherein said sound recorder function uses an existing microphone of said end-user's device.

11. The game call analyzer and device of claim 7 wherein said end-user's device comprises a computer.

12. The game call analyzer and device of claim 7 wherein said end-user's device comprises a handheld mobile device.

13. The game call analyzer and device of claim 7 wherein said end-user's device comprises a tablet.

14. The game call analyzer and device of claim 7 wherein said software program executable medium comprises at least one CD rom.

15. The game call analyzer and device of claim 7 wherein said software program executable medium comprises a mobile application.

16. The game call analyzer and device of claim 1 wherein said simulator function is useful for frightening said at least one game-animal away from said user by reproducing said processed game call sound known to frighten said game-animal.

17. The game call analyzer device of claim 1 wherein said computer comprises a kit including:

at least one CD rom comprising said game call software program; and a set of user instructions.

* * * * *